United States Patent
Naito et al.

(10) Patent No.: US 7,819,928 B2
(45) Date of Patent: Oct. 26, 2010

(54) JIG FOR PRODUCING CAPACITOR, PRODUCTION METHOD FOR CAPACITOR AND CAPACITOR

(75) Inventors: Kazumi Naito, Chiba (JP); Katutoshi Tamura, Chiba (JP)

(73) Assignee: Showa Denko K.K., Tokyo (JP)

( * ) Notice: Subject to any disclaimer, the term of this patent is extended or adjusted under 35 U.S.C. 154(b) by 987 days.

(21) Appl. No.: 10/563,880

(22) PCT Filed: Jul. 9, 2004

(86) PCT No.: PCT/JP2004/010163

§ 371 (c)(1),
(2), (4) Date: Jun. 26, 2006

(87) PCT Pub. No.: WO2005/006360

PCT Pub. Date: Jan. 20, 2005

(65) Prior Publication Data

US 2007/0101565 A1 May 10, 2007
US 2009/0241311 A2 Oct. 1, 2009

Related U.S. Application Data

(60) Provisional application No. 60/487,593, filed on Jul. 17, 2003, provisional application No. 60/542,854, filed on Feb. 10, 2004.

(30) Foreign Application Priority Data

Jul. 10, 2003 (JP) .............................. 2003-194846
Jan. 30, 2004 (JP) .............................. 2004-023120

(51) Int. Cl.
  *H01G 9/00* (2006.01)
(52) U.S. Cl. ........................ 29/25.03; 361/523; 361/534
(58) Field of Classification Search ......... 438/460–465; 361/433, 807, 523, 534; 205/157, 124, 316; 204/297.01–297.06; 118/71, 428, 434, 500, 118/503; 29/25.03
See application file for complete search history.

(56) References Cited

U.S. PATENT DOCUMENTS

| | | | | |
|---|---|---|---|---|
| 4,192,721 A | * | 3/1980 | Fawcett et al. | ............... 205/229 |
| 4,864,472 A | * | 9/1989 | Yoshimura et al. | .......... 361/525 |
| 6,139,592 A | * | 10/2000 | Kamigawa et al. | ......... 29/25.03 |
| 6,671,168 B2 | * | 12/2003 | Yoshida et al. | ............... 361/523 |

FOREIGN PATENT DOCUMENTS

GB  2 026 773 A  2/1980

(Continued)

OTHER PUBLICATIONS

Japanese Office Action dated Sep. 15, 2009 issued in corresponding Japanese Patent Application No. JP 2004-202561.

*Primary Examiner*—David Vu
*Assistant Examiner*—Earl N Taylor
(74) *Attorney, Agent, or Firm*—Sughrue Mion, PLLC

(57) ABSTRACT

The present invention provides a capacitor production method where an electric conductor having a dielectric layer formed thereon is used as one electrode and a semiconductor layer is formed by energization to be the other electrode, comprising the energization performed through a constant current diode, and also provides a jig for producing capacitors, which is used for forming semiconductor layers by energization on two or more electric conductors each having formed on the surface thereof a dielectric layer, the jig comprising two or more current ejection-type constant current sources in accordance with the number of electric conductors, which current sources each has an output electrically connected in series with a connection terminal for the electric conductor. Use of the jig of the present invention, enables production of capacitors including semiconductor as one electrode with a small variation in the capacitance.

13 Claims, 2 Drawing Sheets

FOREIGN PATENT DOCUMENTS

| | | |
|---|---|---|
| JP | 57-28320 | 2/1982 |
| JP | 57-28320 A | 2/1982 |
| JP | 62-185307 A | 8/1987 |
| JP | 63-29919 | 2/1988 |
| JP | 63-29919 A | 2/1988 |
| JP | 63-34917 | 2/1988 |
| JP | 63-34917 A | 2/1988 |
| JP | 63-57733 U | 4/1988 |
| JP | 1-256110 | 10/1989 |
| JP | 2-298010 A | 12/1990 |
| JP | 03-141630 A | 6/1991 |
| JP | 04-236415 A | 8/1992 |
| JP | 4-56445 B2 | 9/1992 |
| JP | 05-021286 A | 1/1993 |
| JP | 6-196376 A | 7/1994 |
| JP | 6-82592 B2 | 10/1994 |
| JP | 7-22080 B2 | 3/1995 |
| JP | 7-226338 A | 8/1995 |
| JP | 9-17685 | 1/1997 |
| JP | 9-102442 | 4/1997 |
| JP | 9-213575 | 8/1997 |
| JP | 11-145007 | 5/1999 |
| JP | 2003-272954 A | 9/2003 |

\* cited by examiner

US 7,819,928 B2

JIG FOR PRODUCING CAPACITOR, PRODUCTION METHOD FOR CAPACITOR AND CAPACITOR

CROSS-REFERENCE TO RELATED APPLICATIONS

This is an application filed pursuant to 35 U.S.C. Section 111(a) with claiming the benefit of U.S. provisional application Ser. No. 60/487,593 filed Jul. 17, 2003 and U.S. provisional application Ser. No. 60/542,854 filed Feb. 10, 2004 under the provision of 35 U.S.C. 111(b), pursuant to 35 U.S.C. Section 119(e)(1).

TECHNICAL FIELD

The present invention relates to a method for producing a capacitor capable of achieving a stable capacitance appearance factor, a jig for producing the capacitor, and a capacitor produced by using the production method or jig.

BACKGROUND ART

A capacitor in the periphery of CPU (central processing unit) used for personal computers and the like is required to be suppressed in the fluctuation of voltage and in order to reduce the heat generation at the passing of a high ripple current, have high capacitance and low ESR (equivalent series resistance).

In general, two or more aluminum or tantalum solid electrolytic capacitors are used.

Such a solid electrolytic capacitor is constituted by an aluminum foil having fine pores in the surface layer or a tantalum powder sintered body having fine pores in the inside, which serves as one part electrode (electric conductor), a dielectric layer formed on the surface layer of the electrode, and the other (counter) electrode (usually a semiconductor layer) provided on the dielectric layer.

With respect to the method for forming the semiconductor layer of a capacitor using a semiconductor layer as the other (counter) electrode, for example, a method of forming the semiconductor layer by means of energization is described in Japanese Patent Nos. 1,868,722, 1,985,056 and 2,054,506. This is a method of dipping an electric conductor having provided on the surface thereof a dielectric layer in a semiconductor layer-forming solution and applying a voltage (passing a current) between the electric conductor serving as the anode and an external electrode (cathode) prepared in the semiconductor layer-forming solution, thereby forming a semiconductor layer.

DISCLOSURE OF THE INVENTION

In the case of forming a semiconductor layer by means of energization on an electric conductor having formed thereon a dielectric layer as described above, no problem arises when a semiconductor layer is formed on one electric conductor, but when two or more electric conductors are processed, individual electric conductors are not necessarily homogenous or the semiconductor formation rate may vary among electric conductors. In particular, when a semiconductor layer is formed simultaneously on multiple electric conductors, variation in the current value of the electrical current flowing through the electric conductors gives rise to production of capacitors uneven in the formation of semiconductor layer in some cases, and this makes it difficult to produce capacitors stabilized in the capacitance.

For example, in an extreme case, one electric conductor becomes defective (mostly, short-circuited) and the current concentrates onto this electric conductor, as a result, almost no current is passed to other electric conductors.

As a result of intensive investigations to solve these problems, the present inventors have found that when the semiconductor layer is formed by supplying a constant current to electric conductors, capacitors having a small variation in the capacitance can be obtained. The present invention has been accomplished based on this finding.

That is, the present invention provides a jig for producing capacitors, a production method for a capacitor, and a capacitor, which are described below.

1. A jig for producing capacitors, which is used for forming a semiconductor layer by means of energization on two or more electric conductors each having formed on the surface thereof a dielectric layer, the jig comprising two or more current ejection-type constant current sources each having an output electrically connected in series with a connection terminal for the electric conductor.

2. A jig for producing capacitors, which is used for forming a dielectric layer and a semiconductor layer by means of energization on two or more electric conductors, wherein the jig comprises diodes each having a cathode connected with each connection terminal of the electric conductors and each having an anode electrically connected to each other, and two or more current ejection-type constant current sources each having an output electrically connected with a connection terminal for the electric conductor.

3. The jig for producing capacitors as described in 1 or 2 above, wherein the current ejection-type constant current sources are constituted by two or more current regulating diodes with respective anodes being electrically connected and each cathode serving as an output.

4. The jig for producing capacitors as described in 1 or 2 above, wherein the connection terminal for the electric conductor and the output of the current ejection-type constant current source are electrically connected through a cable.

5. The jig for producing capacitors as described in 2 or 3 above, wherein the jig comprises a terminal to which respective anodes of the current regulating diodes are electrically connected.

6. The jig for producing capacitors as described in any one of 1 to 4 above, wherein the jig further comprises diodes with each cathode being connected to the connection terminal of each electric conductor and comprises a terminal to which respective anodes of the diodes are electrically connected.

7. The jig for producing capacitors as described in 1, 2, 4 or 6 above, wherein the connection terminal for the electric conductor has a socket structure.

8. The jig for producing capacitors as described in 1, 2, 4 or 6 above, wherein the connection terminal for the electric conductor is a metal sheet.

9. The jig for producing capacitors as described in 1, 2, 4 or 6 above, wherein the connection terminal for the electric conductor is a foil-like metal material formed by means of printing.

10. The jig for producing capacitors as described in 2, 8 or 9 above, wherein the connection terminal for the electric conductor has a comb shape.

11. A method for producing a capacitor, comprising using the jig for producing capacitors described in any one of 1 to 10 above.

12. A method for producing a capacitor, comprising using, as one part electrode, an electric conductor having formed on the surface thereof a dielectric layer, and providing the other electrode by forming a semiconductor layer by means of energization, wherein energization is performed by using a constant current source.

13. The method for producing a capacitor as described in 12 above, wherein the constant current source is constituted by a current regulating diode.

14. The method for producing a capacitor as described in 11 above, wherein the electric conductor having thereon a dielectric layer and being connected to each connection terminal for electric conductor of the jig for producing capacitors is dipped in a semiconductor layer-forming solution and the semiconductor layer is formed by means of energization using the electric conductor side as anode and using an electrode provided in the semiconductor layer-forming solution as cathode.

15. The method for producing a capacitor as described in 11 above, wherein the formation of the dielectric layer on the surface of the electric conductor and the formation of the semiconductor layer are performed by using the same jig for producing capacitors.

16. A capacitor group produced by using the method described in any one of 11 to 15 above.

DETAILED DESCRIPTION OF INVENTION

Figure 1:
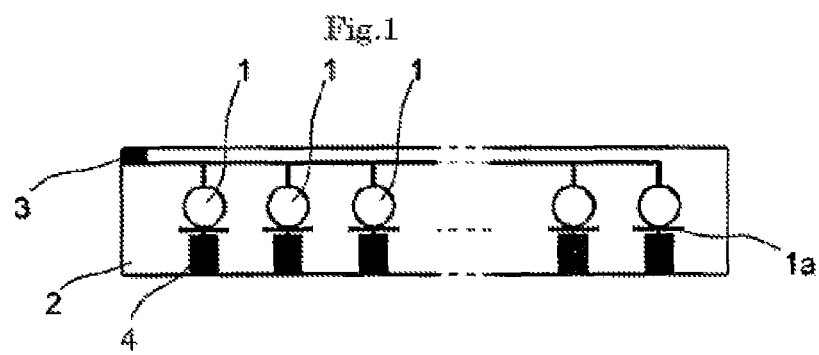
FIG. 1 is a schematic view showing the constitution according to one embodiment of the jig for producing capacitors of the present invention.

The production method of a capacitor and the jig for producing capacitors of the present invention are described in detail below.

Examples of the electric conductor for use in the present invention include a metal, an inorganic semiconductor, an organic semiconductor, a carbon, a mixture comprising at least one of these materials, and a stacked body obtained by stacking an electric conductor on the surface layer thereof.

Examples of the inorganic semiconductor include metal oxides such as lead dioxide, molybdenum dioxide, tungsten dioxide, niobium monoxide, tin dioxide and zirconium monoxide. Examples of the organic semiconductor include electrically conducting polymers such as polypyrrole, polythiophene, polyaniline and substitution product or copolymer having such a polymer skeleton, and low molecular complexes such as complex of tetracyanoquinodimethane (TCNQ) and tetrathiotetracene, and TCNQ salt. Examples of the stacked body obtained by stacking an electric conductor on the surface layer include stacked bodies where the above-described electric conductor is stacked on paper, insulating polymer, glass or the like.

In the case of using a metal as the electric conductor, a part of the metal may be subjected to at least one treatment selected from carbidation, phosphation, boronation, nitridation and sulfidation before use.

The shape of the electric conductor is not particularly limited and may be, for example, a foil, a plate, a bar or a shape after the electric conductor itself is formed into a powder and shaped or shaped and then sintered. The surface of the electric conductor may be treated, for example, by etching to have fine pores. In the case where the electric conductor, after formed into a powder, is shaped or shaped and then sintered, fine pores can be produced in the inside of the shaped or sintered article by appropriately selecting the pressure at the shaping. Also, in the case where the electric conductor, after formed into a powder, a part of a separately prepared outgoing lead wire may be shaped together with the electric conductor and the outgoing lead wire outside the shaped portion may be used as the outgoing lead of one part electrode of the capacitor. Of course, an outgoing lead can also be directly connected to the electric conductor.

Examples of the dielectric layer formed on the surface of the electric conductor of the present invention include a dielectric layer mainly comprising at least one member selected from metal oxides such as $Ta_2O_5$, $Al_2O_3$, $Zr_2O_3$ and $Nb_2O_5$, and a dielectric layer conventionally known in the field of ceramic capacitors or film capacitors. In the case of the former dielectric layer mainly comprising at least one member selected from metal oxides, when the dielectric layer is formed by electrochemical formation of an electric conductor having a metal element of the metal oxide, the produced capacitor becomes an electrolytic capacitor having a polarity. Examples of the dielectric layer conventionally known in the field of ceramic or film capacitors include dielectric layers described in JP-A-63-29919 (the term "JP-A" as used herein means an "unexamined published Japanese patent application") and JP-A-63-34917 both filed by the present applicant. The dielectric layer mainly comprising at least one member selected from metal oxides or the dielectric layer conventionally known in the field of ceramic or film capacitors may be used by stacking two or more these layers. Also, a mixture of the dielectric layer mainly comprising at least one member selected from metal oxides and the dielectric layer conventionally known in the field of ceramic or film capacitor may be used as the dielectric layer.

Examples of the counter electrode for use in the capacitor of the present invention include at least one compound selected from an organic semiconductor and an inorganic semiconductor, but it is important here to form this compound by means of energization which is described later.

Specific examples of the organic semiconductor include an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

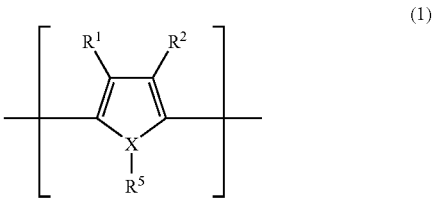

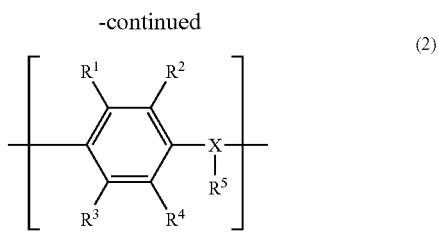

(2)

wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs $R^1$ and $R^2$, and $R^3$ and $R^4$ may combine with each other to form a ring.

Preferred examples of the electrically conducting polymer containing a repeating unit represented by formula (1) for use in the present invention include an electrically conducting polymer containing a structure unit represented by the following formula (3) as a repeating unit:

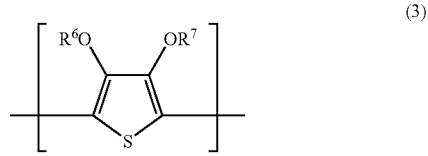

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon ring structure containing two oxygen atoms when the alkyl groups are combined with each other at an arbitrary position. The ring structure includes a structure having a vinylene bond which may be substituted, and a phenylene structure which may be substituted.

The electrically conducting polymer containing such a chemical structure is being electrically charged and a dopant is doped therein. The dopant is not particularly limited and a known dopant can be used.

Examples of the polymer containing a repeating unit represented by formula (1), (2) or (3) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

Specific examples of the inorganic semiconductor include at least one compound selected from molybdenum dioxide, tungsten dioxide, lead dioxide and manganese dioxide.

When the organic or inorganic semiconductor used has an electrical conductivity of $10^{-2}$ to $10^3$ S/cm, the capacitor produced can have a small ESR value and this is preferred.

The semiconductor layer is usually formed by a pure chemical reaction (for example, a solution reaction, a gas phase reaction, a solid-liquid reaction or a combination thereof) without performing an energization operation or formed by means of energization or by a combination of these methods. However, in the present invention, the energization is employed at least once in the semiconductor layer formation step. In forming the semiconductor layer by means of energization, at least one energization operation is performed by using a constant current source for applying current, whereby the object of the present invention can be achieved.

The constant current source may be sufficient if a constant current circuit capable of applying a constant current to the electric conductor having on the surface thereof a dielectric layer can be constituted. The constant current source is preferably constituted, for example, by a current regulating diode where the circuit is simple and the number of parts can be made small. The current regulating diode may be a commercially available current regulating diode or may be constituted by a field effect transistor.

In the following, the constant current source is described mainly by referring to the case of using a current regulating diode, but the constant current source is not limited thereto.

Specifically, the cathode of the current regulating diode is electrically connected in series with the electric conductor (one part electrode) having on the surface thereof a dielectric layer. A solution (semiconductor layer-forming solution) is prepared, in which the raw materials to form a semiconductor after energization and the above-described dopant, if desired, are dissolved, In this semiconductor layer-forming solution, the electric conductor is dipped and a predetermined voltage is applied between an external electrode disposed in this semiconductor layer-forming solution and the anode of the current regulating diode, as a result, a constant current passes according to the rank (current standard) of the current regulating diode (the current regulating diode may also be selected to give a specific current range). This current forms a semiconductor layer on the dielectric layer of the electric conductor. For example, when the electric conductor is a tantalum sintered body having formed on the surface thereof a dielectric layer of $Ta_2O_5$ and being connected with an outgoing lead terminal and the outgoing lead wire and the cathode of the current regulating diode are electrically connected in series, an objective energization circuit can be fabricated. In this case, a voltage is applied to the anode which is the anode of the current regulating diode and to the cathode which is an external electrode disposed in the semiconductor layer-forming solution, In the current regulating diode, when a voltage in a prescribed range is applied in the forward direction, a predetermined constant current passes. Here, the current value can be stepwise varied by selecting the rank of the current regulating diode or by connecting in parallel two or more current regulating diodes having an appropriate rank and therefore, a constant current in an arbitrary range can be passed by selecting the current regulating diode according to the size of electric conductor or the desired amount of semiconductor formed.

The jig for producing capacitors of the present invention, which is used for forming a semiconductor layer by means of (energization on two or more electric conductors each having on the surface thereof a dielectric layer, is described below.

The jig for producing capacitors of the present invention comprises current ejection-type constant current sources and to the output of each constant current source, a connection terminal for each of the electric conductors is electrically connected. In the case of constituting the constant current source by using a current regulating diode, the jig has a constitution, for example, that respective anodes of two or more current regulating diodes are electrically connected and to the cathode of each current regulating diode, the connection terminal for electric conductor is electrically connected in series. FIG. 1 is a schematic view showing one example of a plate-like jig for producing capacitors. On an insulating substrate 2, two or more current regulating diodes 1 are arranged in parallel and connected with each other. Respective anodes (in the Figure, top end parts of 1) of current regulating diodes 1 are electrically connected to a terminal 3 at the left in the Figure (hereinafter, this terminal is sometimes referred to as "current collecting terminal"). Each of the cathodes 1a is respectively connected to one end of the connection terminal 4 for each of the electric conductors and the other end of each connection terminal 4 is electrically opened. The jig having a constitution of FIG. 1 is used in practice by connecting the electric conductor (not shown) having formed on the surface thereof a dielectric layer to each connection terminal (4).

In another embodiment, the jig for producing capacitors of the present invention, which is used for forming a semiconductor layer by means of energization on two or more electric conductors each having formed on the surface thereof a dielectric layer, is a jig for producing capacitors, where the connection terminal for electric conductor and the output of a current ejection-type constant current source are electrically connected through a cable. For example, this is a jig for producing capacitors, where two or more electronic members each obtained by electrically connecting in series the connection terminal for electric conductor to a cable terminal are aligned in the same direction and insulatedly disposed, each cable terminal is further connected by wiring with the cathode of each current regulating diode, and respective anodes of current regulating diodes, which are electrically connected with each other, are connected to a current collecting terminal.

Figure 2:
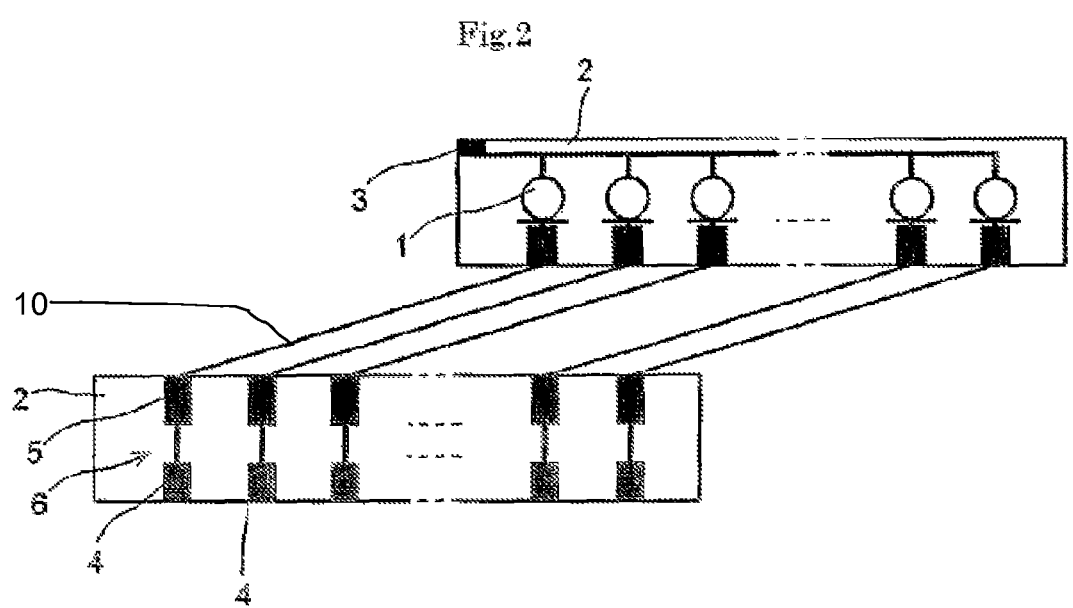
FIG. 2 is a schematic view showing the constitution according to another embodiment of the jig for producing capacitors of the present invention.

FIG. 2 is a schematic view showing one example of a jig for producing capacitors, comprising a current regulating diode group connected by wiring to a part of a plate-like jig for producing capacitors. On an insulating substrate 2, two or more electronic members 6 obtained by connecting in series the connection terminal 4 for electric conductor to a cable terminal 5 are arranged in the same direction. Each of the cathodes 1a of the current regulating diodes 1 is connected by wiring via a cable 10 to each cable terminal 5 and the anodes of the current regulating diode group are connected by circuit to a terminal 3. The jig having a constitution of FIG. 2 is used in practice by adjusting the dimension of the electric conductor (not shown) having formed on the surface thereof a dielectric layer and then connecting it to each connection terminal 4.

In FIG. 1, the current collecting terminal and the current regulating diode are present in the same side (on the front surface) of the insulating substrate, but the current collecting terminal and the current regulating diode may be arranged respectively in opposite sides of the insulating substrate, for example, the current collecting terminal may be disposed on the back surface of the insulating substrate by connecting thereto the circuits through two or more holes provided in the insulating substrate. As for the wiring between the connection terminal and the current regulating diode, for example, wiring to the back surface may be provided by punching holes in the insulating substrate and the connection terminal and the current regulating diode may be arranged respectively on opposite surfaces of the insulating substrate. The hole punched in the insulating substrate is preferably made to take a through hole structure, because printed wiring is applied to the inside of the through hole and this facilitates electrical connection between front and back surfaces. Furthermore, in FIG. 1, the current regulating diode and the connection terminal are disposed on the same surface of the insulating substrate, but, for example, the connection terminal may be disposed on the back surface and connected to the cathode part of the current regulating diode disposed on the front surface through a through hole.

The method of forming a semiconductor layer by means of energization by using the above-described jig for producing capacitors is described below.

One electric conductor having on the surface thereof a dielectric layer is worked to adjust the dimension and connected to each connection terminal for electric conductor of the jig for producing capacitors and then only each electric conductor is dipped in a semiconductor layer-forming solution. Thereafter, a semiconductor layer can be formed by means of energization using the current regulating diode side as anode and using as cathode an external electrode provided in the semiconductor layer-forming solution.

By passing a current through the semiconductor layer-forming solution in which the raw materials to form a semiconductor after energization and optionally added dopant as described above (for example, a known dopant such as arylsulfonic acid or its salt, alkylsulfonic acid or its salt thereof, and various polymer sulfonic acids or their salts) are dissolved, a semiconductor layer is formed on the dielectric layer. The energization time, the concentration, pH and temperature of semiconductor layer-forming solution, and the energization current and voltage vary depending on the kind, size, mass of electric conductor used, the desired thickness of semiconductor layer formed, or the like and therefore, these conditions are previously decided by performing a preliminary experiment. Also, the energization may be performed multiple times by changing the energization conditions. Furthermore, for repairing defects of the dielectric layer formed on the electric conductor, a conventionally known re-electrochemical forming operation may be performed at an arbitrary stage (either once or multiple times) on the way and/or at the final stage of the formation of semiconductor layer.

The external electrode provided in the semiconductor layer-forming solution is used as the counter electrode at the energization and an electrically conducting substance, particularly a metal foil or sheet, is used therefor. It is preferred to use two or more external electrodes electrically connected to at least one power supply part and dispose them so that power can be uniformly distributed to all of a large number of electric conductors dipped in the semiconductor layer-forming solution.

Also, as described in Examples later, after producing electrical fine defects in the dielectric layer formed on the surface of the electric conductor, the semiconductor layer may be formed by the method of the present invention.

Figure 3:
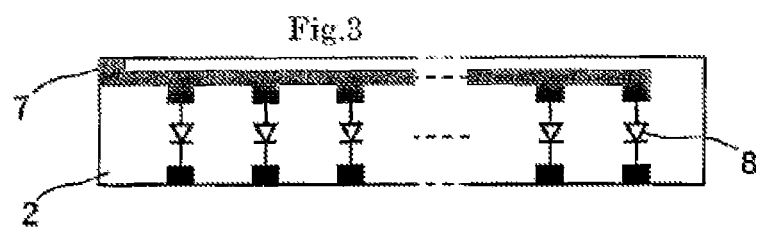
FIG. 3 is a schematic view showing the constitution of the back surface according to one embodiment of the jig for producing capacitors of the present invention.

For example, when, as shown in FIG. 3, electric circuits each electrically Connected only to the connection terminal 4 on the front surface are formed on the back surface of the insulating resin plate 2 shown in FIGS. 1 and 2 and the end of each electric circuit is connected to a terminal 7 (hereinafter, sometimes referred to as a "power supply terminal"), which is provided in the right side when viewed from the front surface, through a diode 8 (preferably a rectifier diode; the anode is on the side of the power supply terminal 7 for electrochemical formation; in the present invention, when simply referred to as "diode(s)", the term does not include a current regulating diode), the formation of the dielectric layer on the surface of the electric conductor connected to each connection terminal 4 and the formation of the semiconductor layer can be performed by the same jig and this is advantageous. More specifically, at the time of providing the dielectric layer on the surface of the electric conductor by electrochemical formation, a current is passed from the power supply terminal 7 for electrochemical formation present on the back surface of the insulating substrate 2, and thereafter, at the time of forming the semiconductor layer on the dielectric layer, a current is passed from the power supply terminal 7 of the insulating substrate 2 or from the current collecting terminal 3 of the current regulating diode group, whereby although the current value for electrochemical formation and the energization value for formation of the semiconductor layer are different, these operations can be achieved by the same jig.

Figure 4:
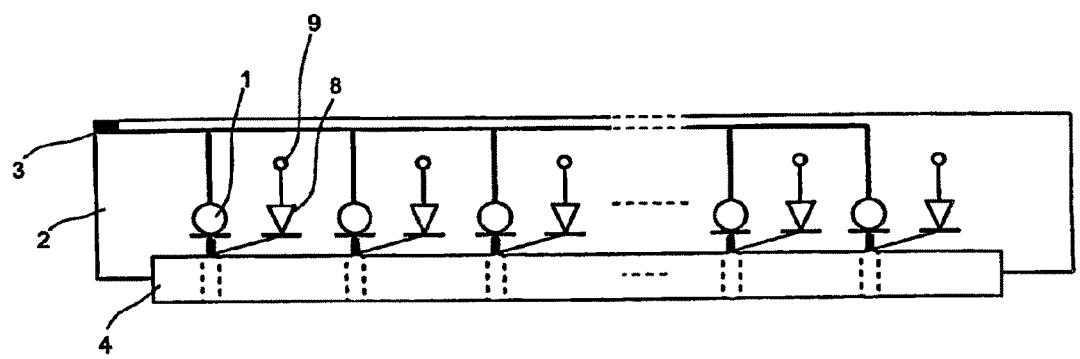
FIG. 4 is a schematic view showing the constitution according to another embodiment of the jig for producing capacitors of the present invention.
Figure 5:
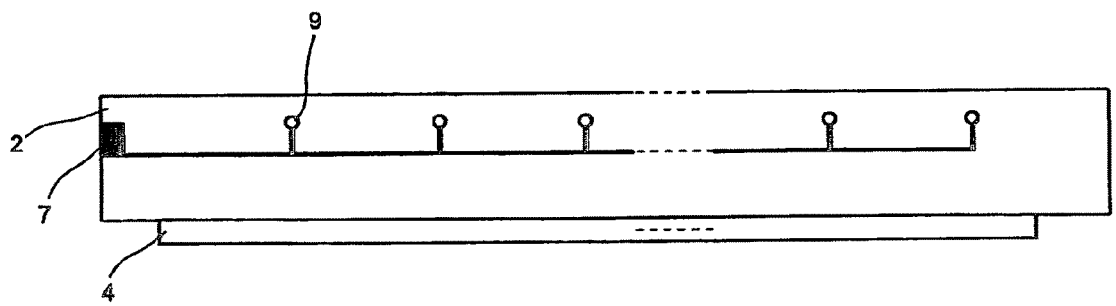
FIG. 5 is a schematic view showing the constitution of the back surface according to one embodiment of the jig for producing capacitors of the present invention.

The arrangement of the current collecting terminal, current regulating diodes, diodes and power supply terminal on the insulating substrate is not particularly limited, but an arrangement facilitating the formation of circuits is preferred. For example, these all may be provided on one surface of the insulating substrate or may be disposed in parts on both surfaces. Specifically, an arrangement where the semiconductor layer-forming circuit of FIG. 1 is provided on one surface of the insulating substrate and the circuit for electrochemical formation of FIG. 3 is provided on the opposite surface, or an arrangement where the circuit (main parts of the semiconductor layer-forming circuit and the electrochemical formation circuit) of FIG. 4 is provided on one surface and the circuit (anode-side common wiring of the electrochemical formation circuit) of FIG. 5 is provided on the opposite surface, may be used. Although the size of connecting terminal is exaggerated for emphasis in FIGS. 4 and 5, connection terminal 4 may have a size such that the bottom surface of connection terminal 4 may be integrated with the bottom surface of insulating substrate.

The method of forming a dielectric layer on the electric conductor surface and forming a semiconductor layer on the dielectric layer by using such a jig for producing capacitors is described below.

One electric conductor is positioned and connected to each connection terminal of the jig for producing capacitors and then each electric conductor is dipped in an electrochemical formation solution. Thereafter, a dielectric layer can be formed, for example, by using as anode the power supply terminal for electrochemical formation and by using as cathode an external electrode provided in the electrochemical formation solution. In the electrochemical formation solution, a conventionally known electrolyte such as organic acid or salt (e.g., adipic acid, acetic acid, ammonium adipate, benzoic acid) and inorganic acid or salt (e.g., phosphoric acid, silicic acid, ammonium phosphate, ammonium silicate, sulfuric acid, ammonium sulfate) is dissolved or suspended. The conditions such as electrochemical formation temperature, time, current value and voltage are determined by performing preliminary experiments while taking account of the kind, size and mass of electric conductor used and the objective standard of capacitor. After the formation of a dielectric layer on the electric conductor surface, the power supply from the power supply terminal for electrochemical formation is stopped and the electric conductor is washed and dried. Subsequently, in the same manner as in the above-described method for forming a semiconductor layer, a current is passed from the terminal on the front surface of the insulating substrate or from the terminal of the current regulating diode group, whereby a semiconductor layer can be formed on the dielectric layer of the electric conductor having formed thereon a dielectric layer.

Examples of the connection terminal of the present invention include a connection terminal of a socket structure, a metal plate and a connection terminal consisting of foil-like metal material formed by printing technique.

In a case where the electric conductor has a bar shape or has a structure including a lead wire connected thereto, a connection terminal of a socket structure may be used for connection with the electric conductor by inserting the bar-shaped electric conductor or the lead wire into the socket part, which is made of metal material so that the connection terminal enables electrical connection with the electric conductor. Examples of metal material used for the socket part include a metal and alloy comprising at least one metal selected from a group consisting of copper, iron, silver and aluminum, and the metal material may be surface-plated with at least one of conventionally known plating such as tin, solder-plating, nickel plating, gold plating, silver plating and copper plating.

It is preferable that a group of connection terminals where connection terminals each comprising a metallic socket and insulating resin part covering the socket are arrayed in parallel be applied as connection terminal in the present invention. For example, among connectors for mounting a semiconductor component on a printed board, a connector having a socket part and a linear lead part electrically connected to the socket part, which lead part is electrically mechanically connected to the output of a current ejection-type constant current source described later which is provided on the insulating substrate. Through this connector, the electric conductor and the current ejection-type constant current source can be electrically connected.

As another example, the connector not having a lead but having a structure that an in-substrate fitting-type receiving part electrically connected to a socket part is provided. In this case, the receiving part of the connector is fitted into the output wiring portion of the insulating substrate having disposed thereon current ejection-type constant current sources, whereby the constant current source and the electric conductor can be connected through the connector.

As still another example, the connector may have a surface mounting-type structure that a printed circuit contact part with a connector electrically connected to a socket part is provided. In this case, for example, a cream solder is attached to the printed circuit contact part and by reflow soldering it to a predetermined wiring portion of the insulating substrate having disposed thereon current ejection-type constant current sources, the connector and the constant current source can be connected.

In a connection terminal with the connection part being a metal sheet, a metal sheet having a size large enough to enable the connection of the electric conductor thereto is used as the terminal. In order to facilitate the connection with the electric conductor, the metal sheet surface is preferably subjected to at least one plating such as tin plating, solder plating, nickel plating, gold plating and silver plating.

The shape of the metal sheet is sufficient if it has a size large enough to enable the connection of the electric conductor. Also, the arrangement of metal sheets is sufficient if the metal sheets are disposed at intervals capable of maintaining the intervals of electric conductors disposed (at almost the same intervals as the intervals of electric conductors disposed).

Particularly, in the case where the intervals between respective electric conductors disposed are wide enough, each metal sheet may be shaped like a comb having two or more tooth parts, whereby the procedure that at the time of initially using the metal sheet, a series of operations of connecting an electric conductor to one tooth part of the comb-like part of each metal sheet and forming a semiconductor layer is performed and after the electric conductor is removed from the metal sheet, at the next time of forming a semiconductor layer on an electric conductor by using the metal sheet, an electric conductor is connected to the unused tooth part of the comb-like part of each metal sheet, can be repeated as many times as the number of tooth parts. This is efficient because production process of a capacitor does not require the operation of removing the connection residue (e.g., lead wire residue of the electric conductor, welding residue at the connection) from the connection terminal part of the jig for producing capacitors every time but after repeating production process of capacitors as many times as the number of tooth parts in the comb-like part of the metal sheet, the connection residue can be removed all at once.

In the case of using a metal sheet as the connection terminal of the insulating substrate having disposed thereon current ejection-type constant current sources described later, when the metal sheet is attached and connected to the substrate bottom side (side working out to the lower end on use) to extend from the back surface to the front surface of the substrate, for example, by the insertion work, the electric conductor can be connected to the metal sheet by a general resistance-welding machine having an electrode in the upper side of the substrate and a receiving electrode in the lower side and this is preferred.

The connection terminal comprising a foil-like metal material and formed by means of printing is obtained by circuit-printing the connection terminal itself by means of printing, and examples of the method therefor include methods using a material mainly comprising copper or an electrically conducting paste mainly comprising metal powder and resin.

In order to attain good connection to the electric conductor, the connection terminal part is preferably subjected to at least one plating selected from tin plating, nickel plating, solder plating, gold plating, silver plating and the like.

Similarly to the above-described case of using a metal sheet as the connection terminal, in the case where two or more connection terminals each comprising a foil-like metal material and formed by means of printing and to which a number of electric conductors are connected are provided on the jig for producing capacitors, the shape of each connection terminal is sufficient if the electric conductor can be connected to the connection terminal, and the arrangement of connection terminals is also sufficient if the connection terminals are disposed at intervals wide enough to maintain the intervals of electric conductors disposed (at almost the same intervals as the intervals of electric conductors disposed). Particularly, when the intervals between respective electric conductors disposed are wide, similarly to the case of using a metal sheet as the connection terminal, connection terminals shaped like a comb can be used.

It is also preferred that the connection terminal part be formed to extend from the front surface to the back surface of the substrate and that these connection terminals on the front and back surfaces be electrically connected. For example, a connection terminal part is printed on both surfaces of the substrate bottom part and the thickness portion of the substrate bottom part is made to take electrical connection by using an electrically conducting paste or the like, whereby electrical conduction can be attained between the connection terminal parts on the front and back surfaces. Alternatively, before or after the printing of a connection terminal part on both surfaces of the substrate bottom part, a through hole may be provided in the printed portion or in the vicinity of the printed portion and by applying printed wiring also in the inside of the through hole, electrical conduction can be attained between the connection terminal parts on the front and back surfaces.

The connection terminal comprising a foil-like metal material and drawn by a printing technique is preferably connected to the current ejection-type constant current source by a method of disposing the constant current source at a predetermined portion of an electronic circuit drawn on the insulating substrate, because this is simple.

A connection terminal having a structure using both a socket structure and a metal sheet also falls in the scope of the present invention. Examples thereof include a connection terminal having a structure comprising an in-substrate fitting-type receiving part and a metal sheet electrically connected to the receiving part, and a connection terminal having a structure comprising a linear lead part and a metal sheet electrically connected to the lead part. For example, in the former case, the above-described receiving part is fit into the output wiring portion of an insulating substrate having disposed thereon current ejection-type constant current sources and an electric conductor is further connected to the metal sheet, whereby the function as a connection terminal is exerted. In the latter case, the linear lead part is inserted into a through hole part produced in an insulating substrate having disposed thereon current ejection-type constant current sources and an electric conductor is further connected to the metal sheet, whereby the function as a connection terminal is exerted.

The jig for producing capacitors of the present invention can be manufactured and used, for example, by connecting current regulating diodes, diodes and if desired, connection terminals each having a socket structure or comprising a metal sheet to an insulating substrate having formed thereon an electric circuit, by means of soldering, insertion fitting followed by soldering, or the like. Examples of the material for the insulating substrate include glass epoxy resin, imide resin and ceramics. The insulating substrate preferably has a thickness of 1 to 10 mm, more preferably from 1.5 to 4.0 mm and, still more preferably from 1.2 to 4.0 mm, when this is used, good dimensional precision, less deformation even after used many times and easy handle-ability are advantageously ensured.

In the capacitor of the present invention, an electrode layer may be provided on the semiconductor layer formed by the above-described method or the like so as to attain good electrical contact with an external outgoing lead (for example, lead frame) of the capacitor.

The electrode layer may be formed, for example, by solidification of electrically conducting paste, plating, vapor deposition of metal, or formation of heat-resistant electrically conducting resin film. Preferred examples of the electrically conducting paste include silver paste, copper paste, aluminum paste, carbon paste and nickel paste, and these may be used individually or in combination of two or more thereof. In the case of using two or more pastes, the pastes may be mixed or may be superposed one on another as separate layers. The electrically conducting paste applied is then solidified by allowing it to stand in air or under heating.

The electrically conducting paste mainly comprises a resin and an electrically conducting powder such as metal and if desired, may contain a solvent for dissolving the resin, a curing agent for resin, and the like. The solvent dissipates at the solidification.

As for the resin in the electrically conducting paste, various known resins such as alkyd resin, acrylic resin, epoxy resin, phenolic resin, imidamide resin, amide resin, styrene resin and urethane resins may be used. For the electrically conducting powder, at least one of a powder of silver, aluminum, gold, carbon, nickel or an alloy mainly comprising such a metal, a coated powder having such a metal on the surface layer, and a mixed powder thereof is used.

The electrically conducting powder is usually contained in an amount of 40 to 97 mass %. If the content is less than 40 mass %, the produced electrically conducting paste is disadvantageously low in the electrical conductivity, whereas if it exceeds 97 mass %, the electrically conducting paste causes adhesion failure and this is not preferred. The electrically conducting paste may be used after mixing thereto an electrically conducting polymer described above for forming the semiconductor layer or a powder of metal oxide.

Examples of the plating include nickel plating, copper plating, silver plating and aluminum plating. Examples of the metal vapor-deposited include aluminum, nickel, copper and silver.

Specifically, for example, a carbon paste and a silver paste are stacked in this order on the counter electrode and then, the entirety is molded with a material such as epoxy resin, thereby fabricating a capacitor. This capacitor may have a lead comprising a metal wire previously or afterward connected to the electric conductor.

The capacitor having such a constitution of the present invention is jacketed, for example, by resin mold, resin case, metallic jacket case, resin dipping or laminate film and thereby, can be completed as a capacitor product for various uses.

Among these, a chip capacitor jacketed by resin mold is preferred, because reduction in the size and cost can be achieved.

The case of jacketing the capacitor by resin mold is specifically described. A part of the electrically conducting layer of the capacitor element obtained as above is laid on one end part of a separately prepared lead frame having a pair of oppositely disposed end parts, and a part of the anode lead part (in order to adjust the dimension, the anode lead may be used after cutting the distal end thereof) is laid on another end part of the lead frame. After electrically or mechanically joining, for example, the former by solidification of an electrically conducting paste and the latter by welding, the entirety is molded with a resin while leaving outside a part of each end part of the lead frame, and the lead frame is cut and bent at predetermined portions outside the resin molding (when the lead frame is present on the bottom surface of resin molding and the entirety is molded while leaving only the bottom surface or the bottom and side surfaces of the lead unmolded, the lead frame may be only cut without bending treatment), whereby the capacitor of the present invention is produced.

The lead frame is cut as described above and finally works out to an external terminal of the capacitor. The shape thereof is a foil or tabular form and the material used therefor is iron, copper, aluminum or an alloy mainly comprising such a metal. The lead frame may be partially or entirely plated with solder, tin, titanium, nickel or the like. Between the lead frame and the plating, a primer plating such as nickel and copper may be provided.

After or before the above-described cutting and bending steps, the lead frame may be plated by these various metals or alloys. It is also possible to plate the lead frame before mounting and connecting the capacitor element and re-plate it at an arbitrary time after molding.

In the lead frame, a pair of oppositely disposed end parts are present and a gap is provided between end parts, whereby the anode part and the cathode part of each capacitor element are insulated from each other.

As for the kind of the resin used for resin mold jacketing, a known resin for use in the molding of a solid electrolytic capacitor, such as epoxy resin, phenol resin and alkyd resin, can be employed, but each resin is preferably a low-stress resin, because when such a resin is used, the molding stress on the capacitor element, which is generated at the molding, can be mitigated. The production machine for performing the molding with resin is preferably a transfer machine.

The thus-produced capacitor may be subjected to an aging treatment so as to repair the thermal and/or physical deterioration of the dielectric layer, which is caused at the formation of electrode layer or at the jacketing.

The aging is performed by applying a predetermined voltage (usually, within 2 times the rated voltage). The optimal values of aging time and temperature vary depending on the kind and capacitance of capacitor and the rated voltage and are previously determined by performing an experiment, but the aging time is usually from several minutes to several days and the aging temperature is usually 300° C. or less in consideration of heat deterioration of the voltage-applying jig. As for the aging atmosphere, the aging may be performed in any one condition of reduced pressure, atmospheric pressure and applied pressure. Also, the aging atmosphere may be an atmosphere of air or a gas such as Ar, $N_2$ and He, but is preferably a water-vapor atmosphere. When the aging is performed in an atmosphere containing water vapor and then performed in air or a gas such as Ar, $N_2$ and He, the stabilization of the dielectric layer sometimes proceeds. It is also possible to perform the aging in a water-vapor atmosphere and after removing excess water content by allowing the capacitor to stand in an air at 150 to 250° C. for 1 minute to 10 hours, perform the aging. Examples of the method for supplying the water vapor include a method of supplying water vapor from a water reservoir placed in the aging furnace by using heat.

As for the method of applying a voltage, an arbitrary current such as direct current, alternating current superposed on direct current (having an arbitrary waveform), and pulse current can be designed to pass. It is also possible to once stop the voltage application on the way of aging and again apply a voltage.

The capacitance of capacitors produced by the present invention is stable since the semiconductor layer can be formed under constant conditions. As a result, the capacitance variation among a capacitor group (a large number of capacitors produced at the same time) is narrow as compared with conventional products. Therefore, in the case of obtaining capacitors having a specific capacitance range, the yield is elevated.

The capacitor group produced by the present invention can be used in digital devices such as personal computer, server, camera, game machine, DVD, AV equipment and cellular phone, and electronic devices such as various power sources.

BEST MODE FOR CARRYING OUT THE INVENTION

The present invention is described in greater detail by referring to Examples, however, the present invention is not limited to these Examples.

EXAMPLE 1

1. Production of Jig for Producing Capacitors

On one surface (hereinafter, referred to as "front surface") of a polyimide plate 2 having a length of 320 mm, a width of 30 mm and a thickness of 2 mm, a circuit connecting the connection terminal 4 as shown in FIG. 1 (stamped with a mark showing the position to which the lead of electric conductor is to be connected) for electric conductor with respective anodes of current regulating diodes 1 and reaching the terminal 3 in the left side of plate (in this Example, the top, bottom, left and right sides follow FIG. 1) was formed by printed wiring. Also, on another surface (hereinafter, referred to as "back surface"), as shown in FIG. 3, a circuit electrically connected only to the connection terminal for electric conductor on the front surface (this circuit, when viewed from the front surface, passes through a rectifier diode 8 (10D-1, manufactured by Nihon Inter Electronics Corporation) and reaches the power supply terminal 7 for electrochemical formation in the right side) was formed by printed wiring. Here, 60 connection terminals 4 for electric conductor were disposed at even intervals. As the current regulating diode, those of 40 µA or less were selected from E-101L (product code: manufactured by Ishizuka Electronics Corporation and each current regulating diode was connected by soldering to fixed positions on the plate 2 (to the plate center side of the connection terminal 4 for electric conductor and to the anode side of the circuit reaching the terminal 3 in the left side).

2. Production of Capacitor

A tantalum sintered body (having a size of 4×3×1 mm and a mass of 72 mg and an outgoing lead wire of 0.29 mmϕ with 7 mm end of the wire protruding from the surface) with CV of 80,000 µF·V/g was used as the electric conductor. In order to prevent solution from splashing up at the later step for forming a semiconductor layer, a tetrafluoroethylene-made washer was attached to the lead wire. These electric conductors were connected by welding to the connection terminals of the jig for producing capacitors, which was produced above, while aligning the direction and height. After preparing 10 sheets in total of the jig for producing capacitors (600 electric conductors were connected in total), the jigs were disposed on a frame (a metal-made frame which holds left and right sides of each jig for producing capacitors and in which the left and right holding portions are electrically insulated from each other, the left side is electrically connected to the terminal for semiconductor formation present on the front surface of the jig, and the right side is electrically connected to the power supply terminal for electrochemical formation present on the back surface of the jig) where jigs can be arrayed in parallel at intervals of 7 mm.

This frame was first disposed to dip the electric conductor portion and a part of the lead wire in an electrochemical formation tank containing an aqueous 0.1% phosphoric acid solution and by using as anode the power supply terminal for electrochemical formation present on the back surface of the jig for producing capacitors and using as cathode an external electrode (tantalum plate) provided in the electrochemical formation tank, electrochemical formation was performed by applying a voltage of 10 V to electric conductors at 80° C. for 10 hours, whereby a dielectric layer comprising $Ta_2O_5$ was formed on the electric conductor and on a part of the outgoing lead. The frame was then pulled up from the electrochemical formation tank, washed with water and dried at 100° C.

Subsequently, an operation of disposing the frame to dip the electric conductor portion alternately in a tank containing an aqueous 20% sodium molybdenum solution and in a tank containing an aqueous 10% sodium borohydride solution was repeated multiple times, whereby fine electrically defective portions were produced in the dielectric layer.

Thereafter, the frame was disposed to dip the electric conductor portion in a tank (a tantalum foil was laminated on the tank and the tank itself serves as the external electrode) containing a semiconductor layer-forming solution (a mixed solution of 20% ethylene glycol and water, where 0.2 M sodium anthraquinonesulfonate and ethylenedioxythiophene were charged in an amount large enough to allow the presence of an insoluble portion) and by using as anode the terminal 3 in the current regulating diode side and using as cathode the external electrode, a current was passed through the terminal 3 at 8 V for 1 hour to form a semiconductor layer. The frame was then pulled up, washed and dried at 100° C. The frame was further disposed to dip the electric conductor portion in the above-described electrochemical formation tank and re-electrochemical formation was performed at 80° C. while applying a voltage of 7 V to electric conductors for 1 hour by using the power supply terminal for electrochemical formation. The frame was then pulled up, washed and dried at 100° C. After repeating 10 times this process of forming a semiconductor layer and performing the re-electrochemical formation, the frame was disposed to dip the electric conductor portion sequentially in a carbon paste tank and then in a silver paste tank, and then dried, whereby an electrode layer was stacked on the semiconductor layer.

Individual electric conductors after the formation of the electrode layer were removed from each jig for producing capacitors, On two protruded parts of a separately prepared lead frame having a tin-plated surface, the lead wire of the electric conductor was laid in the anode side and connected by spot welding and the silver paste side of the electric conductor was laid in the cathode side and connected by a silver paste. Thereafter, the entirety excluding a part of the lead frame was molded with epoxy resin (the lead frame was cut at predetermined positions outside the resin mold and then bent) to produce a chip capacitor having a size of 7.3×4.3×1.8 mm. The capacitors obtained had a capacitance of 480 µF at a rated voltage of 2.5 V and the capacitance distribution thereof was such that the number of capacitors in the range of 470 to 490 µF was 469, the number of capacitors in the range of 490 to 510 µF was 85, the number of capacitors in the range of 510 to 530 µF was 4, the number of capacitors in the range of 450 to 470 µF was 39 and the number of capacitors in the range of 430 to 450 µF was 3.

COMPARATIVE EXAMPLE 1

Capacitors for comparison were produced by forming the semiconductor layer in Example 1 while passing a current at 8 V for 1 hour directly to electric conductors without intervention of the jig for producing capacitors of the present invention. The capacitance distribution of the capacitors for comparison was such that the number of capacitors in the range of 470 to 490 µF was 285, the number of capacitors in the range of 490 to 510 µF was 54, the number of capacitors in the range of 510 to 530 µF was 16, the number of capacitors in the range of 530 to 550 µF was 3, the number of capacitors in the range of 450 to 470 µF was 144, the number of capacitors in the range of 430 to 450 µF was 71, and the number of capacitors in the range of 380 to 430 µF was 27.

As seen from the results in Example 1 and Comparative Example 1, the capacitor group obtained in Example 1 has apparently a narrower capacitance distribution than the capacitor group obtained in Comparative Example 1.

EXAMPLE 2

1. Production of Jig for Producing Capacitors

On one surface (referred to as "front surface") of a glass epoxy plate 2 having a length of 320 mm, a width of 30 mm and a thickness of 1.2 mm, a circuit of FIG. 4 was formed by printed wiring and on another surface (referred to as "back surface"), a circuit of FIG. 5 was formed by printed wiring. More specifically, a circuit connecting the connection terminal 4 having a socket structure for electric conductor with respective anodes of current regulating diodes 1 and reaching the current collecting terminal 3 in the left side of plate, and a circuit connected to the connection terminal 4 on the front surface of plate, which was passing through each of rectifier diodes 8 arrayed in parallel alternately with current regulating diodes and from the through hole 9, reaching the power supply terminal 7 for electrochemical formation on the back surface of plate, were formed. The connection terminal for electric conductor used was a connection terminal having a round pin DIP socket structure with 64 pins at a pitch of 2.54 mm (PCD Receptacle 399 Series, manufactured by Tokiwa & Co., Inc.) and by providing 64 through holes corresponding to the sockets in the glass epoxy plate, the socket pin was inserted into the through hole and connected by soldering. As the current regulating diode, those of 40 to 70 AA were selected from E-101L manufactured by Ishizuka Electronics Corporation and each current regulating diode was connected by soldering. Also, EP05DA40 manufactured by Nihon Inter Electronics Corporation was used as the rectifier diode and each rectifier diode was connected by soldering.

2. Production of Capacitor

A tantalum sintered body (having a size of 4.1×3×1.5 mm and a mass of 115 mg and an outgoing lead wire of 0.52 mmφ one end of which wire was embedded by 4 mm in the inside of the sintered body and 10 mm of the other end protruding out from the surface) with CV of 70,000 μF·V/g was used as the electric conductor. In order to prevent solution from splashing up at the later step of forming a semiconductor layer, a tetrafluoroethylene-made washer was attached to the lead wire. The thus-constituted electric conductors were inserted into the connection terminals of the jig for producing capacitors, which was produced above, while aligning the direction.

After preparing 10 sheets in total of the jig for producing capacitors (640 electric conductors were connected in total), the jigs were disposed on the same frame as used in Example 1, where jigs could be arrayed in parallel at intervals of 11 mm. This frame was first disposed to dip the electric conductor portion and a part of the lead wire in an electrochemical formation tank containing an aqueous 0.1% phosphoric acid solution and by using as anode the power supply terminal for electrochemical formation present on the back surface of the jig for producing capacitors and using as cathode an external electrode (tantalum plate) provided in the electrochemical formation tank, electrochemical formation was performed by applying a voltage of 9 V to electric conductors at 80° C. for 10 hours, whereby a dielectric layer comprising $Ta_2O_5$ was formed on the electric conductor and on a part of the outgoing lead. The frame was then pulled up from the electrochemical formation tank, washed with water and dried at 100° C. Subsequently, by repeating a series of operations that the frame was disposed to dip the electric conductor portion in a tank containing an alcohol solution of 2% ethylenedioxythiophene, pulled up, left standing, disposed to dip the electric conductor potion in a tank containing an alcohol solution of 18% iron naphthalenesulfonate, pulled up, left standing at 40° C. for 30 minutes, disposed to dip the electric conductor portion in a tank containing an alcohol, pulled up and dried 80° C., fine electrically defective portions mainly comprising an ethylenedioxy polymer were produced on the dielectric layer.

Thereafter, the frame was disposed to dip the electric conductor portion in an electrochemical formation tank containing an aqueous 0.1% acetic acid solution and by using as anode the power supply terminal for electrochemical formation present on the back surface of the jig for producing capacitors and using as cathode an external electrode (tantalum plate) provided in the electrochemical formation tank, re-electrochemical formation was performed by applying a voltage of 8 V to electric conductors at 80° C. for 15 minutes. Subsequently, the frame was disposed to dip the electric conductor portion in a tank (a tantalum foil is laminated on the tank and the tank itself serves as the external electrode) containing a semiconductor layer-forming solution (a mixed solution of 20% ethylene glycol and water, where an aqueous ethylenedioxythiophene monomer solution in a saturated concentration or less and anthraquinonesulfonic acid were dissolved) and by using as anode the current collecting terminal 3 in the current regulating diode side and using cathode the external electrode, a current was applied to the current collecting terminal 3 at 11 V for 30 minutes to form a semiconductor layer. The frame was then pulled up, washed with water and further with alcohol, and dried at 80° C. The frame was disposed to dip the electric conductor portion in the above-described electrochemical formation tank and re-electrochemical formation was performed at 80° C. while applying a voltage of 7 V to electric conductors for 15 minutes by using the power supply terminal for electrochemical formation. The frame was then pulled up, washed with water and further with alcohol, and dried at 80° C. After repeating 10 times this process of forming a semiconductor layer and performing the re-electrochemical formation, the frame was disposed to dip the electric conductor portion sequentially in a carbon paste tank and in a silver paste tank and then dried, whereby an electrode layer was stacked on the semiconductor layer.

Individual electric conductors after the formation of the electrode layer were removed from each jig for producing capacitors. On two end parts of a separately prepared lead frame having a tin-plated surface, the lead wire of the electric conductor was laid in the anode side while cutting and removing a part of the lead wire and connected by spot welding and the silver paste side of the electric conductor was laid in the cathode side and connected by a silver paste. Thereafter, the entirety excluding a part of the lead frame was molded with epoxy resin (the lead frame was cut at predetermined positions outside the resin mold and then bent) to produce a chip capacitor having a size of 7.3×4.3×2.8 mm. This capacitor was left standing in a constant humidity tank at 60° C. and 90% RH for 24 hours, then dried at 185° C. for 10 minutes and subjected to aging at 125° C. while applying a voltage of 3.5 V to the electric conductor for 5 hours. The capacitors obtained had a capacitance of 680 μF at a rated voltage of 2.5 V and the capacitance distribution thereof was such that the number of capacitors in the range of 720 to 645 μF was 572, the number of capacitors in the range of 720 to 750 μF was 42, the number of capacitors in the range of 750 to 780 μF was 20, and the number of capacitors in the range of 645 to 610 μF was 6.

COMPARATIVE EXAMPLE 2

Capacitors for comparison were produced by forming the semiconductor layer in Example 1 while passing a current at 11 V for 30 minutes directly to electric conductors without intervention of the jig for producing capacitors of the present invention. The capacitance distribution of the capacitors for comparison was such that the number of capacitors in the range of 720 to 645 μF was 351, the number of capacitors in the range of 720 to 750 μF was 25, the number of capacitors in the range of 750 to 780 μF was 2, the number of capacitors in the range of 645 to 610 μF was 157, the number of capacitors in the range of 610 to 575 μF was 88, the number of capacitors in the range of 575 to 540 μF was 13, and the number of capacitors in the range of 540 to 510 μF was 4.

As seen from the results in Example 2 and Comparative Example 2, the capacitor group obtained in Example 2 has apparently a narrower capacitance distribution than the capacitor group obtained in Comparative Example 2.

INDUSTRIAL APPLICABILITY

The present invention provides a jig for producing capacitors and a production method for a capacitor, where the semiconductor layer is formed by passing a current through a current regulating diode. According to the present invention, a capacitor group having a narrow appearance capacitance distribution can be obtained.

The invention claimed is:

1. A jig for producing capacitors, which is used for forming a semiconductor layer by means of energization on two or more electric conductors each having formed on the surface thereof a dielectric layer, the jig comprising two or more current ejection-type constant current sources each having an output electrically connected in series with a connection terminal for the electric conductor, wherein the connection terminal comprises a holding portion for holding the electric conductor and energization is conducted at the holding portion.

2. A jig for producing capacitors, which is used for forming a dielectric layer and a semiconductor layer by means of energization on two or more electric conductors, wherein the jig comprises diodes each having a cathode connected with a connection terminal of the respective electric conductors and each having an anode electrically connected to each other, and two or more current ejection-type constant current sources each having an output electrically connected with a connection terminal for the electric conductor.

3. The jig for producing capacitors as claimed in claim 1, wherein the current ejection-type constant current sources are constituted by two or more current regulating diodes with respective anodes being electrically connected and each cathode serving as an output.

4. The jig for producing capacitors as claimed in claim 1, wherein the connection terminal for the electric conductor and the output of the current ejection-type constant current source are electrically connected through a cable.

5. The jig for producing capacitors as claimed in claim 2, wherein the jig comprises a terminal to which respective anodes of the current regulating diodes are electrically connected.

6. The jig for producing capacitors as claimed in claim 1, wherein the jig further comprises diodes with each cathode being connected to the connection terminal of each electric conductor and comprises a terminal to which respective anodes of the diodes are electrically connected.

7. The jig for producing capacitors as claimed in claim 1, wherein the connection terminal for the electric conductor has a socket structure.

8. The jig for producing capacitors as claimed in claim 1, wherein the connection terminal for the electric conductor is a metal sheet.

9. The jig for producing capacitors as claimed in claim 1, wherein the connection terminal for the electric conductor is a foil-like metal material formed by means of printing.

10. The jig for producing capacitors as claimed in claim 2, wherein the connection terminal for the electric conductor has a comb shape.

11. The jig for producing capacitors as claimed in claim 1, wherein individual ones of the current ejection-type constant current sources pass a predetermined constant current through respective ones of the electric conductors to which they are electrically connected.

12. The jig for producing capacitors as claimed in claim 2, wherein individual ones of the current ejection-type constant current sources pass a predetermined constant current through respective ones of the electric conductors to which they are electrically connected.

13. The jig for producing capacitors as claimed in claim 1, wherein the electric conductor is held in the holding portion by welding or by inserting the electric conductor in a socket.

* * * * *